United States Patent

[11] 3,571,783

| [72] | Inventor | George E. Lusk |
| | | Downers Grove, Ill. |
| [21] | Appl. No. | 830,690 |
| [22] | Filed | June 5, 1969 |
| [45] | Patented | Mar. 23, 1971 |
| [73] | Assignee | G & W Electric Specialty Company |
| | | Blue Island, Ill. |

[54] CABLE JOINING DEVICE FOR PLASTIC AND ELASTOMERIC INSULATED CABLES
10 Claims, 9 Drawing Figs.

[52] U.S. Cl. ................................................. 339/117,
174/21, 339/177
[51] Int. Cl. ................................................. H01r 3/04,
H01r 17/18
[50] Field of Search.......................................... 174/17.08,
25, 47, 59; 339/15, 64, 65, 89, 94, 116, 117, 154,
205, 259, 177

[56] References Cited
UNITED STATES PATENTS

| 2,894,054 | 7/1959 | Cameron et al. | 339/177X |
| 3,241,095 | 3/1966 | Phillips | 339/117X |
| 3,439,110 | 4/1969 | Lusk | 339/259X |
| 3,509,518 | 4/1970 | Phillips | 339/177X |

*Primary Examiner*—Marvin A. Champion
*Assistant Examiner*—Terrell P. Lewis
*Attorney*—Hume, Clement, Hume & Lee ABSTRACT: The cable joining device has utility for electrically connecting the prepared ends of two opposed power cables. A female connector nest formed of metal segments which are expandable is located within a plastic housing open at respective ends. The bare copper end of the cables to be joined are each fitted with a male connector and which are respectively inserted in the connector nest for mechanically and electrically connecting the opposed power cables.

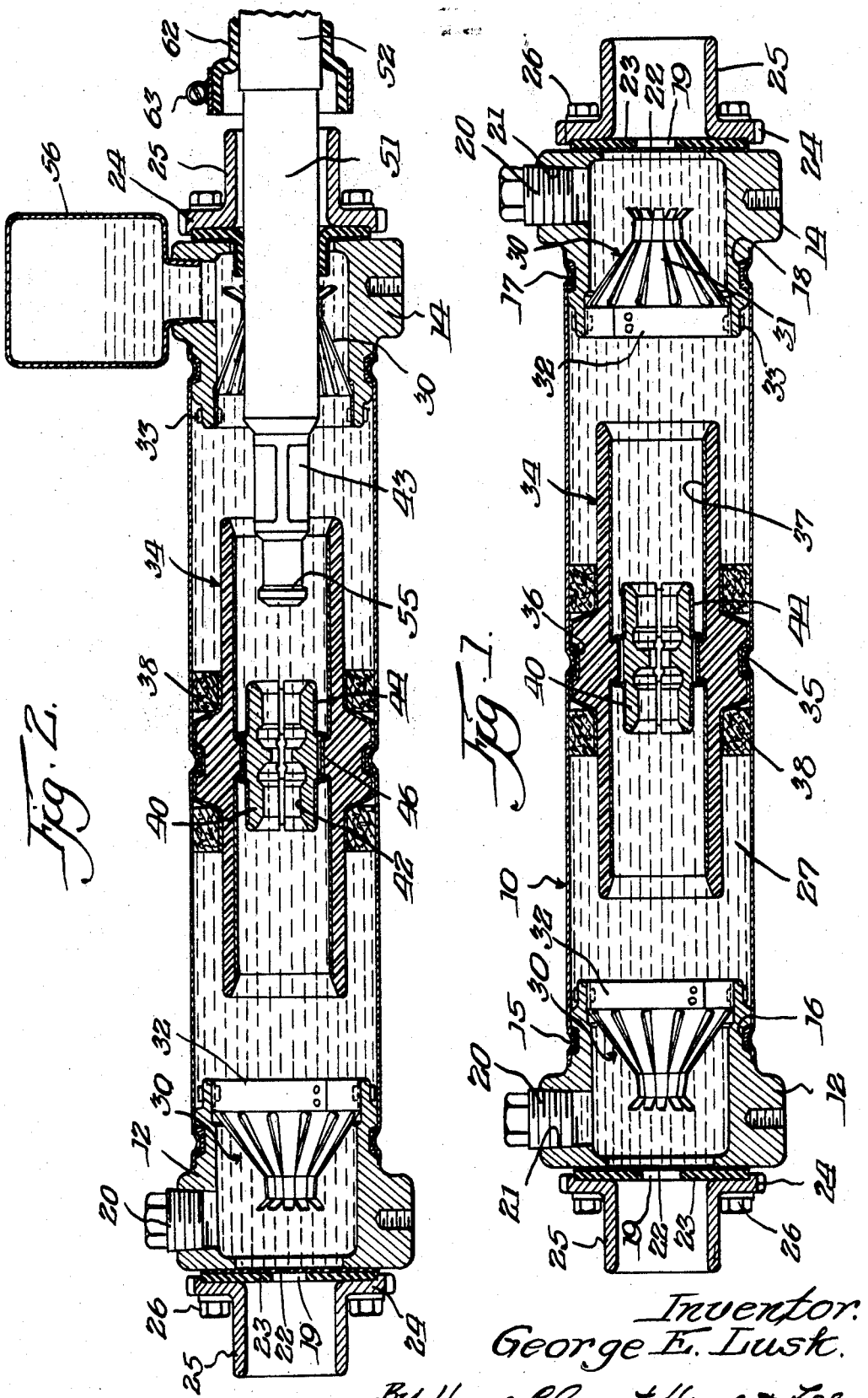

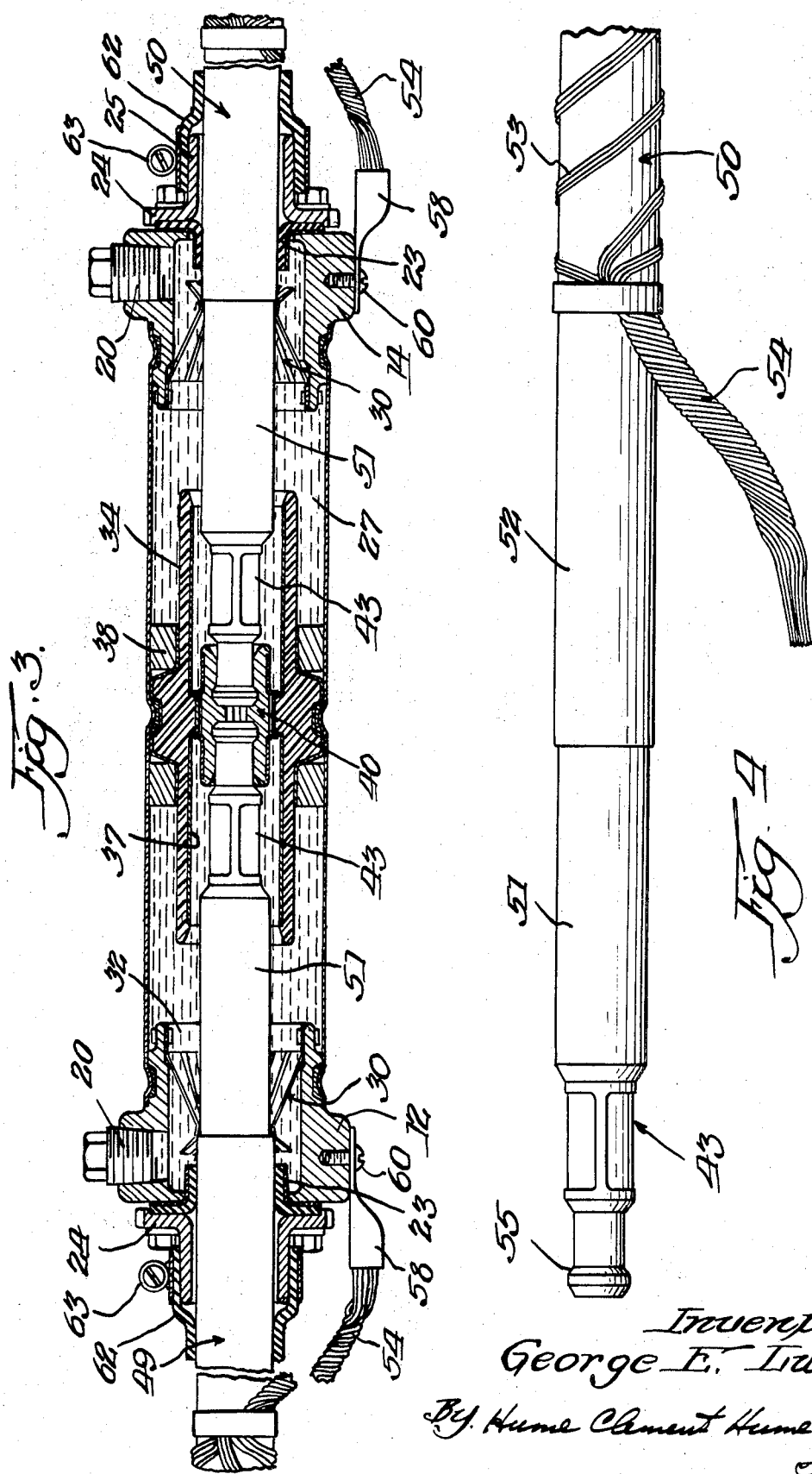

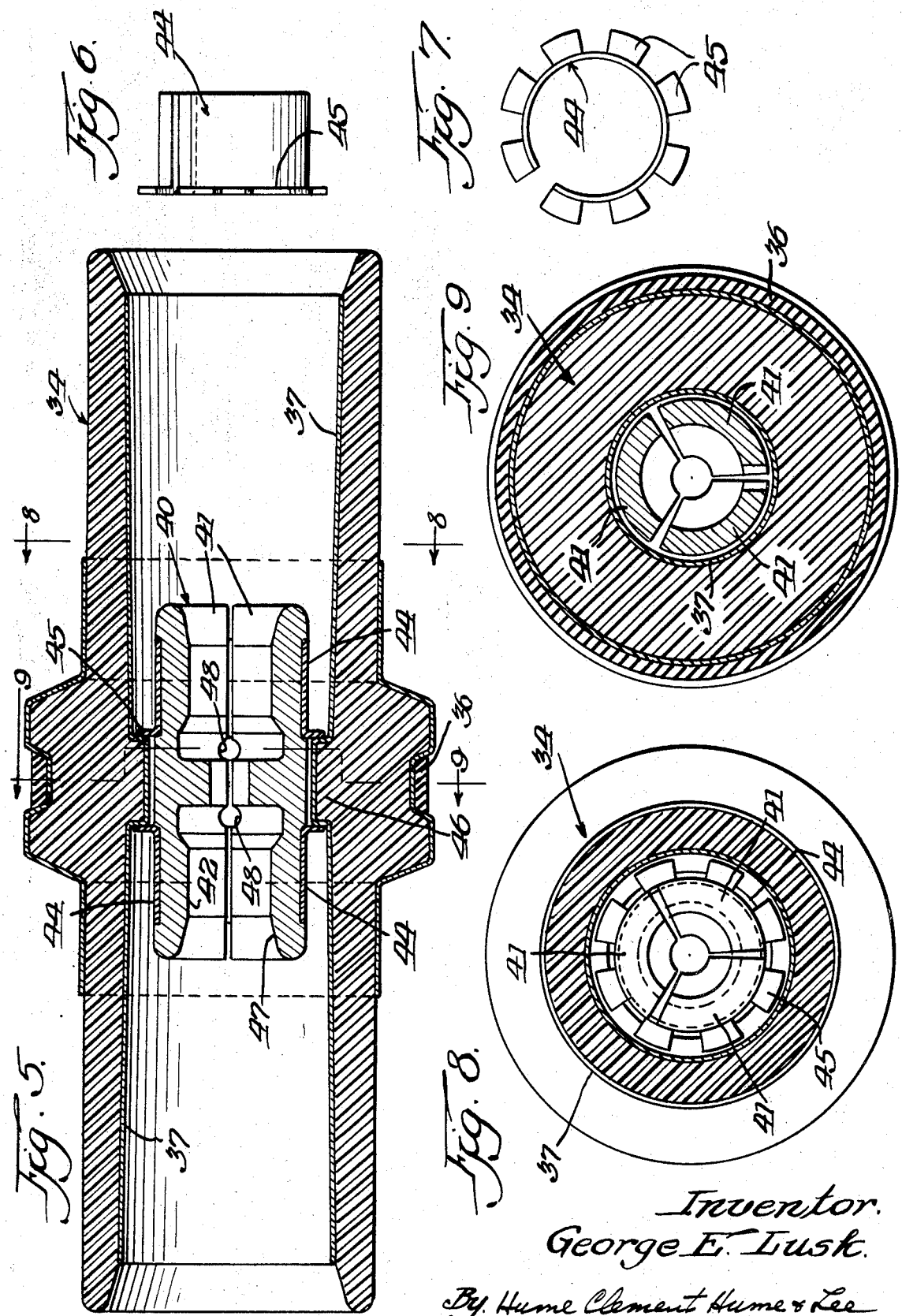

CABLE JOINING DEVICE FOR PLASTIC AND ELASTOMERIC INSULATED CABLES

The invention relates to improved structure for joining or connecting together the ends of two power cables and has reference more particularly to a cable splice having an expandable female connector nest adapted to receive male connectors that are fitted to the prepared terminal ends of the power cables.

There are three basic methods for joining, splicing or tying together cables of the type and character here involved. The most common method in use is the complete construction of an insulation belt surrounding the prepared cable ends with hand applied, usually half lapped, insulating tapes. The time to construct such a joint and the amount of skill required is very high. In addition to the above, the thickness of insulation buildup required in the higher voltages to obtain the desired dielectric strengths usually imposes a severe thermal limitation on the system. There is always heat generated within a cable joint during service including the current squared resistance losses in the conductor system and the dielectric losses in the surrounding insulation belt. The heavy insulation walls associated with tape buildup restricts the capability of the system to liberate the heat generated. High and possibly excessive conductor temperatures are the result.

The second type of joint construction currently in use also involves a hand applied tape buildup but in this case the tape used is genetically similar to the cable insulation material. After the hand applied tape is in place, the whole joint area is heated up either by an enclosing oven system, heated mold or in some cases by the ignition of a surrounding pyrotechnic covering. The end result is an integrally fused mass of insulation.

The technique again requires the time and skill associated with hand applied types plus the additional complication of having to fuse the mass into a monolith. The advantage of this system over the first is improved dielectric characteristics which allows the use of smaller diameter insulation belts with attendant improved thermal characteristics.

The third system now in use incorporates a premolded solid elastomeric assembly into which the prepared cable ends are pushed. This system materially reduces both the time and skill required to make up a joint. However, due to the high modulus of the solid elastomeric insulating unit, the cable receiving holes in the elastomer have to be closely matched to the diameter of the cable being joined. Too tight a fit can make assembly impossible while too loose a fit can lead to dielectric failure.

An object of the present invention is to provide cable joining structure which will retain the desirable advantages of the structures previously discussed without retaining any of their disadvantages.

Another object of the invention resides in the provision of a cable joining device wherein the bare cable ends are fitted with male connector elements, wherein the metal casing of the device is provided with expandable stress control shields and with diaphragm entrance seals, and wherein the metal casing contains a dielectric filling compound, all similar in basic aspects to cable terminator systems.

Another object is to provide a joining device for connecting power cables which will essentially include an expandable metal connector located within a tubular plastic housing centrally positioned within the metal casing, and wherein the metal connector is formed by segments which are made expandable by being retained in operative relation by encircling resilient collars or spring members.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIG. 1 is a sectional view taken longitudinally of the joining device of the invention and illustrating the internal structure of the same prior to the insertion of the cable ends for connection;

FIG. 2 is a sectional longitudinal view similar to FIG. 1, but showing the manner of inserting a cable end fitted with a male connector element into one end of the joining device;

FIG. 3 is a sectional longitudinal view similar to FIGS. 1 and 2 but showing the fitted cable ends of two power cables fully inserted and connected by the joining device of the invention;

FIG. 4 is an elevational view showing the prepared end of a power cable fitted with a male connector element in accordance with the invention;

FIG. 5 is a sectional view on an enlarged scale showing the plastic housing member with the expandable connector in associated relation therewith;

FIG. 6 is an elevational view of one of the resilient collars for the expandable female connector nest;

FIG. 7 is an end elevational view of the resilient collar of FIG. 6 showing the split formation and the provision of base flanges;

FIG. 8 is a transverse sectional view taken substantially on line 8—8 of FIG. 5; and FIG. 9 is a transverse sectional view taken substantially on line 9—9 of FIG. 5.

Referring to the drawings and in particular to FIG. 1 it will be observed that the cable joining device of the invention essentially includes the metal casing 10 of cylindrical tubular form and which has a length approximately four times its diameter. At each end the metal casing is provided with a metal end member such as 12 and 14 and the respective end members are fixedly secured to the metal casing by being swaged thereto, although the parts could be welded or otherwise joined. The end member 12 is circumferentially grooved and by swaging at 15 the metal casing is joined thereto. The resilient gasket 16 is interposed between. The swaging forms an exterior groove around the metal casing which satisfactorily retains the parts in connected relation. In the same manner the opposite end of the metal casing is swaged at 17 and the resilient gasket 18 is located between the casing and the end member 14.

The end members are tubular in shape and a threaded plug 20 is provided for closing the opening 21 in the thick part of the wall of each end member. Also the end opening 19 in each member through which the cables enter the joining device, is initially closed at the factory by a thin film 22 formed of a plastic such as Polyester or Polyethylene. The plastic film 22 and the elastomeric diaphragm 23 are clamped to the end members respectively by a clamping plate 24 which is characterized by a cylindrical outwardly extending flange 25. The film and diaphragm are located between the end wall of each member and its clamping plate which is in turn secured to the end member by the bolts 26. At the factory the metal casing is filled with a dielectric compound 27 which is admitted to the interior of the casing by removing the plugs 20. When filled the plugs are threaded in place and the dielectric filling compound is retained since the open ends 19 of the casing are closed by the plastic films 22. However, the elastomeric diaphragms are each centrally apertured for receiving the cable ends to be joined by the device. The opening in each diaphragm is in tension circumferentially of the inserted cable. This forms a seal with the cable after the cable has been inserted and prevents escape of the filling compound.

A stress control shield 30 is located within each tubular end member, the same including a plurality of spring fingers 31 which are preferably integral with the metal of the circular base 32. The stress control shield is similar to that as shown in the Lusk Pat. No. 3,336,435, granted Aug. 15, 1967. The circular base 32 of the stress control shield is secured to the end member by the rivets 33 and this grounds the shield to the end member.

The housing 34 of the cable joining device is formed of plastic or other suitable insulating material and the housing is fixed and retained centrally within the casing 10. The walls of the housing have an increased thickness centrally of the length of the housing and a groove is formed so that the metal casing can be swaged to the housing at 35. A gasket 36 is located between the parts at the swaged location. The housing is tubular and the same is open at both ends. Also the housing is somewhat smaller in length and smaller in diameter than the metal casing and the housing is disposed concentrically within the same. The plastic housing is conduction coated as indicated by the numeral 37 on its interior bore and on its outside midsection surface generally over and on each side of its exterior positioning belt. Sufficient surface exterior to the plastic molding on each side is left uncoated to provide the necessary dielectric leakage distance. The distance left uncoated is proportional to the voltage rating of the device.

A closed cell elastomeric sponge such as 38 is positioned on each side of the exterior belt of the plastic housing to provide compensation for thermal expansion and contraction of the dielectric compound filling the cable joining device. The conductive coating applied to the surfaces of the molding will shield the closed cell sponge material from dielectric overstress.

The actual connecting device of the invention essentially comprises the connector 40 which is formed of metal for good current conductive purposes and is made of three or more segments for purposes of expansion. The connector 40 is best shown in FIGS. 5, 8 and 9 wherein it will be observed that three segmental elements 41 are assembled to form the complete connector. Each segmental element is arcuate as regards its outside surface. However, on its inside, each element is shaped in a special manner so that when the segments of the connector are operatively connected, the interior cavity 42 will be complementary to the shape of the male connector elements 43 shown in FIG. 4. The three segmental elements 41 of the connector are resiliently retained in assembled relation by a pair of resilient split rings or collars 44 having base flange elements 45. The exterior of the connector 40 is recessed on each side of its longitudinal center for receiving the resilient rings 44. The rings have a dual function since they retain the segments 41 in operative assembled relation and also fixedly position the connector within the housing. This section function of the resilient rings is accomplished by the base flanges 45 which are positioned on respective sides of the interior circumferential projection 46 of the plastic housing. The resilient rings by means of their base flanges fix the location of the connector within the plastic housing and prevent the same from moving when the male connector elements 43, which have been fitted to the cable ends, are inserted.

As previously stated, the cable joining device is filled at the factory with a dielectric compound which as described in the Lusk Pat. No. 3,222,883, granted May 30, 1967 may consist of a blended mixture of high molecular weight polybutenes and low molecular weight polyolefins, together with an inhibitor. The compound is further characterized by having a high tack value to the solid dielectric insulation of the cables, and to the elements within the metal casing 10 including the stress control shields 30 down to temperatures as low as minus twenty degrees Fahrenheit. In advance of inserting the ends of the cables 49 and 50 to be connected, the said ends are stripped down to the bare copper conductor and the male connector elements 43 are fitted thereto. This preparation of the cable ends exposes the cable insulation 51 and the semiconductive jacket 52. The ground wires 53 are stripped and collected at 54 as shown in FIG. 4.

The plugs 20 are next removed to allow escape of the filling compound and the cable ends are then inserted causing a puncturing of the film 22 at the respective ends of the metal casing. The prepared end of each cable passes through the center opening in the diaphragms and the action is such as to form a collar portion from the diaphragm around the cable. As previously stated this collar portion is in tension and the same is directed inwardly of the casing due to the inward travel of the cable ends being inserted. These collar portions grip the cable insulation and prevent leakage of the dielectric filling compound. As the cables enter the interior of the casing they also pass through the stress control shields, the resilient fingers of which will expand to receive the cable. During this insertion of the cable ends, the excess filling compound will escape from the openings 21 in the end members.

The insertion of the prepared ends of the cables 49 and 50 is continued until the male connector members 43 interfit with the metal connector 40. The cavities 42 of the connector are each tapered at the entrance end as at 42 to facilitate the inserting operation and the forward nose of the male connector elements 43 are also tapered for the same reason. The rear angle 55 on each male connector element is particularly important since this angle can be made sufficiently steep approximating an angle of 90° whereby to prevent retraction or an accidental pullout of the male connector elements. Thus the degree of removal force required can be controlled by varying the angle 55. To allow escape of the filling compound 27 from within the female connector nest during the connecting operation the openings 48 are provided.

The bottle 56 is employed during the connecting operation to collect the excess filling compound. When the connection of the two male connector elements 43 with the connector 40 is complete, the bottle is removed and the plug 20 is again threaded in place. It will be understood that the relaxed internal diameter of the rings 44 is smaller than the outside diameter of the connector 40 when the male connectors are engaged. The expansion of the female connector nest when the male connectors are inserted causes the springs to develop contact force between the segments and the male connectors. This source is required for a good electrical contact.

The cable joining device of the invention is completed by electrically connecting the ground wires 54 to the end members 12 and 14 respectively. A metal lug 58 and the screw 60 are employed for this purpose. Also the circular flanges 25 of the clamping plates 24 receive the elastomeric boots 62. This helps to seal the clamping plates since it will be observed that each elastomeric boot 62 is secured by the securing hose clamp 63 to the flange 25 of its clamping plate and each elastomeric boot has a sealing contact with the cable at its end of the device.

I claim:

1. In a cable joining device for joining the prepared ends of two opposed cables, in combination, a metal casing having end members fixedly secured thereto, an opening in each and member communicating with the interior of the metal casing, a tubular housing of insulating material located within the metal casing, each end of said housing being in spaced concentric relation therewith and being fixedly secured to the metal casing on approximately the longitudinal center of both parts, a connector having a similar shaped cavity on respective sides of its transverse centerline, and resilient means carried by the connector on each side of the centerline and performing a dual function, said resilient means rendering possible circumferential expansion of the connector, and said resilient means also locking the connector within the housing with the cavities respectively being in substantial alignment with the openings in the end members.

2. A cable joining device for joining the prepared end of two opposed cables as defined in claim 1, wherein a clamping plate is fixed to each end member, a thin plastic film and an elastomeric diaphragm being interposed between each end member and the clamping plate and being clamped by said plate, said thin plastic film closing and sealing the opening in its end member until the prepared cable end is inserted, said elastomeric diaphragm having a central opening therein for receiving the prepared cable end and which has a sealing contact therewith following insertion.

3. A cable joining device for joining the prepared end of two opposed cables as defined by claim 1, wherein a female connector nest is formed of metal segments and wherein the resilient means comprise split resilient rings in encircling engagement with the connector on respective sides of its transverse centerline.

4. A cable joining device for joining the prepared end of two opposed cables as defined in claim 1 wherein a clamping plate is fixed to each end member, a thin plastic film and an elastomeric diaphragm being interposed between each end member and the clamping plate and being clamped by said plate, said thin plastic film closing and sealing the opening in its end member until the prepared cable end is inserted, said elastomeric diaphragm having a central opening therein for receiving the prepared cable end and which has a sealing contact therewith following insertion, wherein a female connector nest is formed of metal segments, and wherein the resilient means comprise split resilient rings in encircling engagement with the connector on respective sides of its transverse centerline.

5. In a cable joining device for joining the prepared ends of two opposed cables, in combination a metal casing of tubular formation having end members fixedly secured thereto, an opening in each end member communicating with the interior of the metal casing, a tubular housing of insulating material located within the metal casing, each end of said housing being in spaced concentric relation therewith and being fixedly secured to the metal casing at approximately the longitudinal center of both parts, a metal connector having a similar shaped cavity on respective sides of its transverse centerline, and means fixedly securing the connector within the housing approximately centrally of the length of the housing and with the cavities respectively being in substantial alignment with the openings in the end members.

6. A cable joining device for joining the prepared ends of two opposed cables as defined by claim 5, wherein a metal female connector nest is formed of angular disposed segments, and wherein the segments are retained in operative connected relation by the means fixedly securing the connector within the housing, said means comprising a pair of split resilient rings in encircling engagement with the connector, a ring being located on each side of the transverse center line of the connector.

7. A cable joining device as defined by claim 5, for joining the prepared ends of two opposed cables, each cable comprising a copper conductor with insulator thereon, wherein the end of each cable is prepared by stripping said insulator to expose the copper conductor and wherein a male connector of metal is fitted to the bare copper end, said male connector having a shape at its terminal end which is complementary to the shape of the cavity in a female connector nest which receives the male connector upon insertion of the cable end for joining the said cables.

8. A cable joining device for joining the prepared ends of two opposed cables as defined by claim 5, additionally including a clamping plate fixed to each end member, a thin plastic film and an elastomeric diaphragm interposed between each end member and the clamping plate and being clamped by said plate, said thin plastic film closing and sealing the opening in its end member until the prepared cable end is inserted, said elastomeric diaphragm having a central opening therein for receiving the prepared cable end and which has a sealing contact therewith following insertion.

9. A cable joining device for joining the prepared ends of two opposed cables as defined by claim 8, wherein the metal casing and attached end members contain a dielectric compound which completely fills the interior of the parts, said dielectric compound being contained within the casing and end members by the thin plastic films which seal the openings in the end members.

10. A cable joining device as defined by claim 8, for joining the prepared ends of two opposed cables, each cable comprising a copper conductor with insulator thereon, wherein the end of each cable is prepared by stripping said insulator to expose the copper conductor, and wherein a male connector of metal is fitted to the bare copper end, said male connector having a shape at its terminal end which is complementary to the shape of the cavity in the connector which receives the male connector upon insertion of the cable end for joining the cables.

UNITED STATES PATENT OFFICE
CERTIFICATE OF CORRECTION

Patent No. 3,571,783          Dated March 23, 1971

Inventor(s) George E. Lusk

It is certified that error appears in the above-identified patent and that said Letters Patent are hereby corrected as shown below:

Column 1, line 23, "buildup" should read -- buildups --
Column 4, line 10, "42" should read -- 47 --; line 46, "and" should read -- end --.

Signed and sealed this 9th day of November 1971.

(SEAL)
Attest:

EDWARD M. FLETCHER, JR.          ROBERT GOTTSCHALK
Attesting Officer                Acting Commissioner of Pat